US010292325B2

(12) United States Patent
Azenha et al.

(10) Patent No.: US 10,292,325 B2
(45) Date of Patent: May 21, 2019

(54) APPARATUS FOR PLANTING AND TREATING SEEDLINGS OF AN AGRICULTURAL PLANT

(71) Applicant: BASF SE, Ludwigshafen (DE)

(72) Inventors: Antonio Cesar Azenha, Ribeirao Preto (BR); Nilton Degaspari, Piracicaba (BR); Cassio da Silva Cardoso Teixeira, Sao Paulo (BR)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/908,691

(22) PCT Filed: Jul. 29, 2014

(86) PCT No.: PCT/EP2014/066281
§ 371 (c)(1),
(2) Date: Jan. 29, 2016

(87) PCT Pub. No.: WO2015/014842
PCT Pub. Date: Feb. 5, 2015

(65) Prior Publication Data
US 2016/0165793 A1    Jun. 16, 2016

(30) Foreign Application Priority Data
Aug. 2, 2013 (EP) .................................... 13179059

(51) Int. Cl.
*A01C 23/04* (2006.01)
*A01C 11/00* (2006.01)
(Continued)

(52) U.S. Cl.
CPC ............ *A01C 11/006* (2013.01); *A01C 5/062* (2013.01); *A01C 5/064* (2013.01); *A01C 5/068* (2013.01);
(Continued)

(58) Field of Classification Search
CPC ......... A01C 11/00; A01C 11/02; A01C 11/06; A01C 23/047; A01C 23/00; A01C 5/068;
(Continued)

(56) References Cited

U.S. PATENT DOCUMENTS 3,060,872 A * 10/1962 Ackley ................ A01C 23/047
111/125
3,890,909 A *  6/1975 Boots ..................... A01C 11/00
111/134
(Continued)

FOREIGN PATENT DOCUMENTS

AU         1651183           1/1984
CN         2297041           11/1998
(Continued)

OTHER PUBLICATIONS

International Search Report, issued in PCT/EP2014/066281, dated Sep. 4, 2014.
(Continued)

*Primary Examiner* — Christopher J. Novosad
(74) *Attorney, Agent, or Firm* — Brinks Gilson & Lione

(57) ABSTRACT

The present invention relates to an apparatus for planting and treating seedlings of an agricultural plant. In particular, the apparatus is adapted for planting and treating sugar cane seedlings. The apparatus comprises means for moving the apparatus over a field with soil in which the seedlings are to be planted. Further, it comprises a tray for holding a plurality of seedlings and a furrow opener for automatically creating a furrow in the field when the apparatus is moved over the field. Moreover, the apparatus comprises a spraying device for applying a fertilizer, an insecticide, a fungicide, and/or a nutrient to the furrow. Furthermore, the apparatus comprises a furrow compactor that is adapted to close the furrow with soil and to compact the soil surrounding the seedling in the closed furrow. Moreover, the invention relates to the use of this apparatus for planting a seedling of a graminaceous plant, in particular the seedling of a sugar cane plant.

18 Claims, 19 Drawing Sheets

Figure 1:
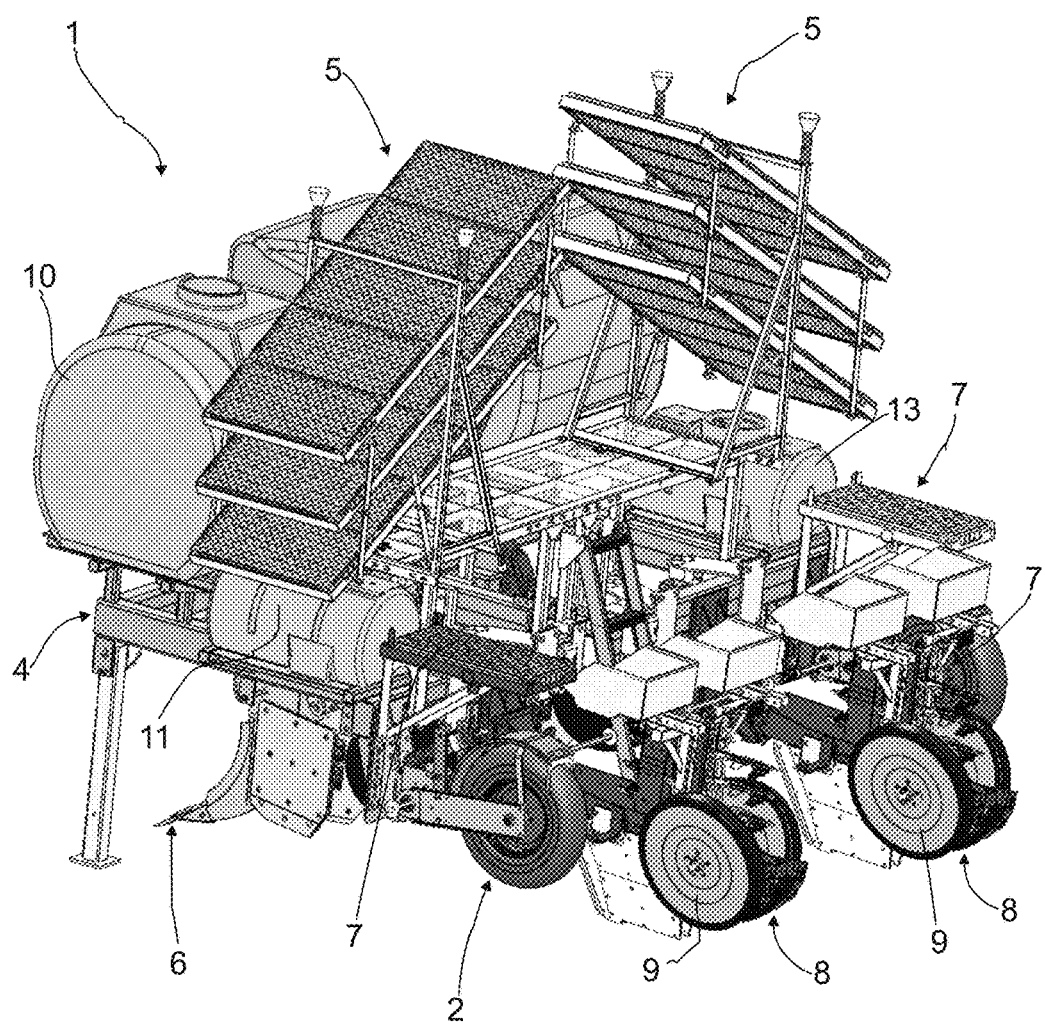

(51) Int. Cl.
  *A01C 11/02* (2006.01)
  *A01C 23/00* (2006.01)
  *A01C 5/06* (2006.01)
  *A01C 7/06* (2006.01)

(52) U.S. Cl.
  CPC .............. *A01C 7/06* (2013.01); *A01C 11/025* (2013.01); *A01C 23/008* (2013.01); *A01C 23/047* (2013.01)

(58) Field of Classification Search
  CPC ... A01C 11/006; A01C 11/025; A01C 23/008; A01C 23/04; A01C 5/062; A01C 5/06; A01C 5/00; A01C 5/064; A01C 7/06; A01C 7/00
  USPC ......................................................... 111/105
  See application file for complete search history.

(56) References Cited

U.S. PATENT DOCUMENTS

| | | |
|---|---|---|
| 4,314,514 A | 2/1982 | Binder |
| 4,450,778 A | 5/1984 | Quick |
| 5,402,740 A * | 4/1995 | Kinoshita .............. A01C 11/02 111/105 |
| 6,634,306 B1 * | 10/2003 | Faulring .............. A01C 11/025 111/105 |
| 7,444,948 B1 | 11/2008 | Thompson |
| 8,122,838 B2 * | 2/2012 | Faulring .............. A01C 11/025 111/105 |
| 9,271,448 B2 * | 3/2016 | Degaspari .............. A01N 25/00 |
| 9,615,503 B2 * | 4/2017 | Werner .................. A01C 11/00 |

FOREIGN PATENT DOCUMENTS

| | | |
|---|---|---|
| CN | 201355914 | 12/2009 |
| EP | 0283701 A1 | 9/1988 |
| GB | 337412 A | 10/1930 |
| WO | 9114356 A1 | 10/1991 |
| WO | 2013041665 A1 | 3/2013 |
| WO | 2013160241 A1 | 10/2013 |
| WO | 2013160242 A1 | 10/2013 |

OTHER PUBLICATIONS

International Preliminary Report on Patentability, issued in PCT/EP2014/066281, dated Sep. 8, 2015.

* cited by examiner

APPARATUS FOR PLANTING AND TREATING SEEDLINGS OF AN AGRICULTURAL PLANT

This application is a National Stage application of International Application No. PCT/EP2014/066281, filed Jul. 29, 2014. This application also claims priority under 35 U.S.C. § 119 to European Patent Application No. 13179059.4, filed Aug. 2, 2013.

The present invention relates to an apparatus for planting and treating seedlings of an agricultural plant. In particular, the apparatus is adapted for planting and treating sugar cane seedlings. Moreover, the invention relates to the use of this apparatus for planting a seedling of a graminaceous plant, in particular the seedling of a sugar cane plant.

The seed of sugar cane is a dry one-seeded fruit or caryopsis formed from a single carpel, the ovary wall pericarp being united with the seed-coat testa.

Disadvantageously, the seed of sugar cane only germinates under specific environmental characteristics, such as a constant warm and humid climate conditions. Such climatic conditions are not found everywhere sugar cane is grown and therefore germination of sugar cane seed is not always guaranteed. For commercial agriculture, the seed of a sugar cane is not sown, but instead, the cane is propagated vegetatively by planting a stem segment or part of a stalk or culm.

The stem of sugar cane, as well as the stem of graminaceous plants, comprises several nodes, from which new plants grow. The traditional planting process of sugar cane involves the reservation of an area of the crop to be used as a source of plants for replanting, since the nodes are comprised in the stem. The plants used for replanting are harvested and then cut in segments of approximately 20 to 50 cm, so that at least two nodes are present in each stem segment sett. Cutting the stems is needed to break apical dominance that otherwise causes poor germination when using full length uncut stems. The segments are cut to have at least two buds or at least two nodes; every node gives generally rise to one single bud to assure germination, because not every bud germinates.

In WO 91/14356 A1 a billet planter is described. The planter includes a cutting apparatus which is adapted to cut the cane stalks into billets and to feed them to the delivery chute. The planter is supported on wheels and is adapted to be hitched to a tractor's three point linkage by the hitch assembly.

Furthermore, U.S. Pat. No. 4,450,778 describes a sugar cane billet planter. The billet planter described therein includes a furrow opening assembly and a fertilizer distributor. It also comprises a billet metering mechanism that includes a billet delivery assembly.

Moreover, U.S. Pat. No. 4,314,514 describes a sugar cane planter including a main frame which may be hitched to the rear of a tractor. It further comprises a furrow plough for opening a furrow being mounted under the main frame. Furthermore, the planter comprises a hopper that is capable of receiving a large quantity of cane setts to be planted. The cane setts are then discharged so that they enter the furrow.

Moreover, EP 0 283 701 A1 describes a method for the planting of plants, wherein a furrow is formed by means of a plowshare and plants are dropped into the furrow. In the method, the plant is supported at the landing stage by means of a rearwardly directed liquid or gas jet so as to prevent tilting of the plant forwards.

Current machines used to cut sugar cane segments are not able to identify any characteristic in the stem, and therefore the precise position of the cut sites is determined at random. After cutting, the setts, which have one or more nodes, are disposed horizontally, over one another in furrows of the ploughed soil, which are generally wide at ground level and 40 to 50 cm wide and 30 to 40 cm deep, and then lightly covered with soil.

Although this plantation technique is still being used until today, the whole process is relatively inefficient because many segments of two to four nodes have to be used to guarantee the germination. The consequence is that a large area for re-planting needs to be used, and therefore area that could be employed for the crop and production of alcohol or sugar has to be reserved for re-planting. Thus, there is a necessity to increase the efficiency of the planting technique of sugar cane.

Furthermore, it is known to plant seedlings of sugar cane plants. However, the seedlings are much more sensitive so that known planters for sugar can bullits or setts cannot be used.

It is therefore the object of the present invention to provide an apparatus for planting and treating seedlings of an agricultural plant that can plant the seedlings efficiently and gentle so that the seedlings are not damage by the planting procedure, especially with optimal conditions for the further growth.

According to the invention, this object has been achieved by the apparatus as defined in claim 1. Further features of this apparatus are defined in the dependent claims.

The apparatus for planting and treating seedlings of an agricultural plant according to the present invention comprises means for moving the apparatus over a field with soil in which the seedlings are to be planted. Further, it comprises a tray for holding a plurality of seedlings and a furrow opener for automatically creating a furrow in the field when the apparatus is moved over the field. Moreover, the apparatus comprises a spraying device for applying a fertilizer, an insecticide, a fungicide, and/or a nutrient to the furrow. Furthermore, the apparatus comprises a furrow compactor that is adapted to close the furrow with soil and to compact the soil surrounding the seedling in the closed furrow.

Furthermore, the apparatus comprises a seedlings conveying device for putting the seedlings from the tray in the furrow.

Moreover, the apparatus comprises a coupling mechanism that couples said seedlings conveying device and said furrow compactor The apparatus of the present invention is not adapted for planting stalks or bullits, but for planting seedlings. The apparatus is able to deliver the seedlings and provide all meanings for a high survival rate of the planted seedlings. The planting can be carried out at the optimum upward positioning and deepness and an efficient chemical treatment is provided for optimal conditions for the further growth. The seedlings may be planted in a linear fashion by moving the apparatus over the field. This will yield a linear harvesting at the end of the cycle, thereby reducing damage to the plants and increasing crop yield. Advantageously, the apparatus provides a fully integrated planting mechanism and seedling treatment for germinated seedlings.

According to the invention the furrow opener may comprise a ground levering device. This device may be made with a non-stick material, in particular, having ultra high molecular weight (UHMW).

According to an embodiment of the apparatus according to the invention said coupling mechanism urges said furrow compactor against the soil besides the furrow so that the seedlings conveying device coupled to the furrow compactor has a constant height over the soil when the apparatus is moved over the field.

According to a further embodiment of the apparatus according to the invention said coupling mechanism urges said furrow compactor against the soil so that the furrow compactor compacts the soil surrounding the seedling with constant strength when the apparatus is moved over the field.

According to an embodiment of the apparatus according to the invention the furrow compactor comprises at least two wheels, said wheels being arranged on both sides of a movement part of the furrow opener. Advantageously, these wheels may securely compact the soil surrounding the seedling without damaging the seedling.

According to a further embodiment of the apparatus according to the invention said coupling mechanism urges said wheels of said furrow compactor against the soil besides the furrow so that the seedlings conveying device coupled to at least one of the wheels has a constant height over the soil when the apparatus is moved over the field.

According to a further embodiment of the apparatus according to the invention said coupling mechanism urges said wheels of said furrow compactor against the soil so that the wheels compact the soil surrounding the seedling with constant strength when the apparatus is moved over the field.

By means the above-mentioned embodiments a rather precise seedlings deposit and planting operation is achieved. In particular, if there are irregularities or bumps on the surface of the field plating of the seedlings with a variable deepness is avoided. Therefore, a standard deepness planting of the seedlings is achieved. In particular the seedlings conveying device leverages height and thus provide two characteristics: The seedlings are planted with a regular deepness and with a regular compaction strength, regardless of soil irregularities.

According to the invention the seedlings may be fed manually to the seedlings conveying device which then puts the seedlings manually or automatically in the furrow. Furthermore, according to another embodiment, the seedlings conveying device is adapted to automatically take seedlings from the tray and to put them in the furrow. Therefore, the seedlings are delivered into the open furrow by the seedlings conveying device.

In particular, the seedlings conveying device comprises a clamp unit for holding the seedling and putting the seedling in the furrow. Preferably, the clamp unit is adapted to clamp the bale of the seedling. In this case, the fragile stem of the seedling may not be damaged. The clamp unit may be fed by seedlings manually or the clamp unit may automatically take seedlings from the tray.

According to a further embodiment of the apparatus according to the invention the coupling mechanism couples the clamp unit of the seedlings conveying device and the furrow compactor.

According to an embodiment of the apparatus according to the invention said coupling mechanism urges said furrow compactor against the soil besides the furrow so that the clamp unit coupled to the furrow compactor has a constant height over the soil when the apparatus is moved over the field.

By means of this embodiments a rather precise seedlings deposit and planting operation is achieved. In particular, if there are irregularities or bumps on the surface of the field plating of the seedlings with a variable deepness is avoided. Therefore, the seedlings are planted with a regular deepness, regardless of soil irregularities.

This coupling mechanism preferably comprises a spring mechanism. The spring mechanism urges the furrow compactor, in particular the wheels of the furrow compactor, against the soil beside the furrow so that the seedlings conveying device, in particular the clamp unit, coupled to the furrow compactor, in particular at least one of the wheels, has a constant height over the soil when the apparatus is moved over the field. In addition, the spring mechanism urges the furrow compactor, in particular the wheels, against the soil so that the furrow compactor, in particular the wheels, compacts the soil surrounding the seedling with constant strength when the apparatus is moved over the field. By this means a rather precise seedlings deposit and planting operation is achieved. In particular, if there are irregularities or bumps on the surface of the field plating of the seedlings with a variable deepness is avoided. Therefore, a standard deepness planting of the seedlings is achieved.

According to the invention, the clamp unit leverages height and thus provide two characteristics: The seedlings are planted with a regular deepness and with a regular compaction strength, regardless of soil irregularities.

According to the invention the furrow is automatically opened by the apparatus. Furthermore, the furrow is closed, leveraged and compacted.

According to a further embodiment of the present invention said coupling mechanism is a pantographic device. A pantograph device provides a mechanical linkage connected in a manner based on parallelograms so that the movement of one part produces identical movements of the other part.

According to a further embodiment of the present invention the apparatus comprises a tank for insecticides and a tank for fungicides both coupled to the spraying device. The spraying device is adapted to apply both insecticide and fungicide to the seedling in the soil. Therefore, the apparatus can carry out the spraying process of both insecticide and fungicide to the planted seedlings with just one single equipment. Therefore, the apparatus may provide an integrated seedling treatment that enhances the survival rate of the transplanted seedlings.

In addition, the apparatus of the present invention may comprise means for applying nutrition and fertilizers for the planted seedlings. For the nutrition and fertilizers additional tanks may be to provide it.

Moreover, the apparatus may comprise a water tank coupled to the spraying device. In this case the spraying device is further adapted to apply water to the soil surrounding the seedling. Water is therefore used for humidity supply and for compacting the soil further after the planting process.

According to a further embodiment of the present invention the apparatus comprises means for deploying superabsorbers to the surrounding of the seedling being placed in the furrow. The superabsorbers may be used as substrate for the seedlings. It may supplement the soil surrounding the seedlings or replace such soil.

According to an embodiment of the present invention the tray and the seedlings extractor are adapted to hold and deliver sugar cane seedlings to the soil.

Furthermore, the means for moving the apparatus over the field preferably comprises wheels, in particular dynamic traction wheels. Such wheels are mounted at the frame of the apparatus so that they can be pivoted in order to balance irregularities of the soil on which the apparatus is moved.

The present invention further relates to the use of the apparatus described above for plating a seedling of a graminaceous plant, in particular a seedling of a sugar cane plant.

Embodiments of the present invention are now described with reference of the drawings.

Figure 2:
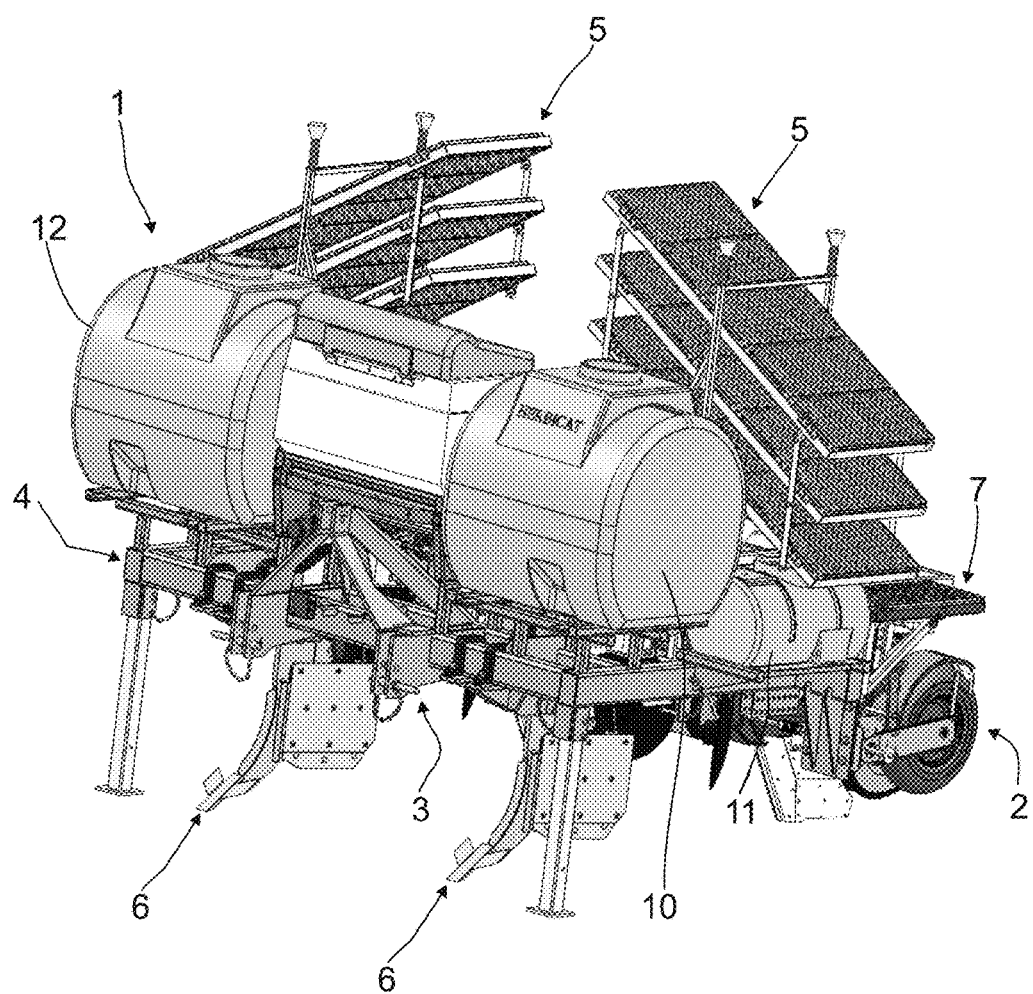
Figure 3:
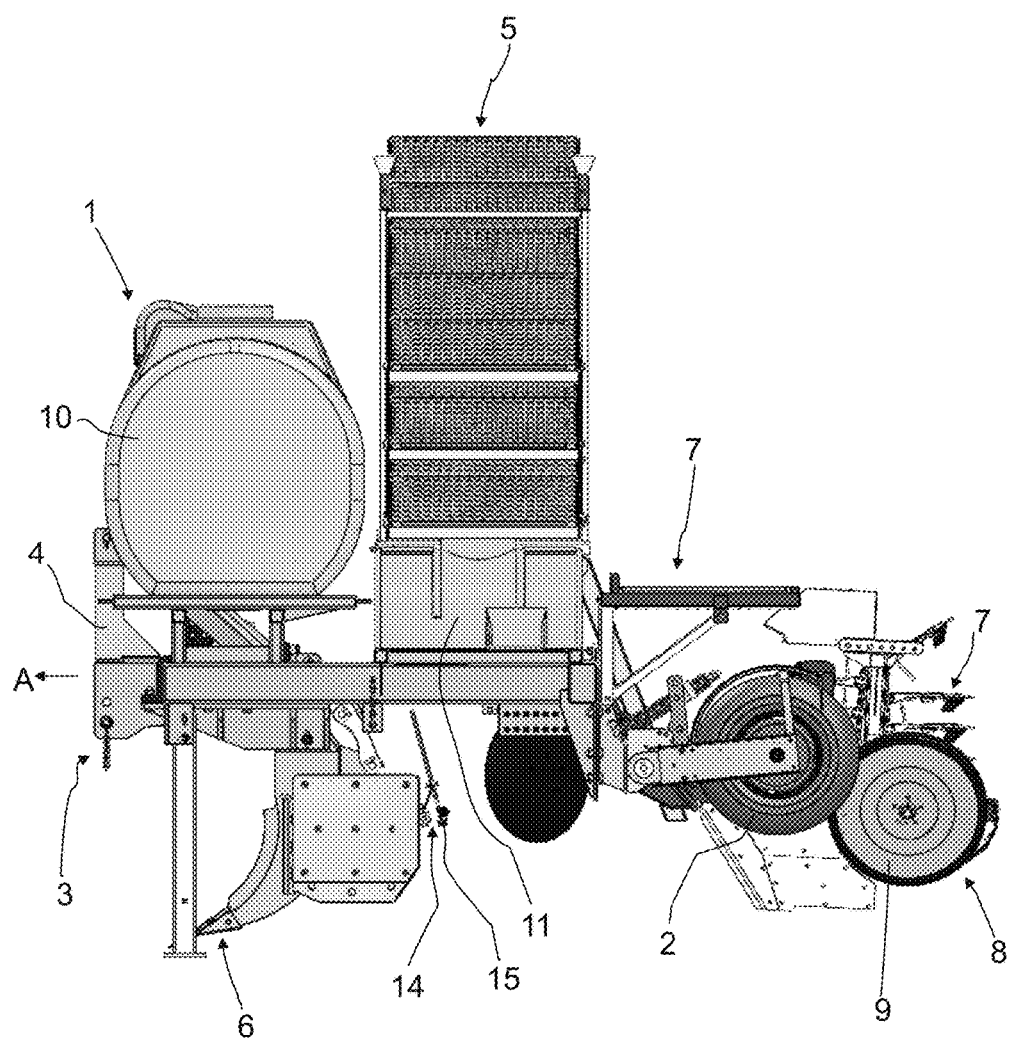
Figure 4:
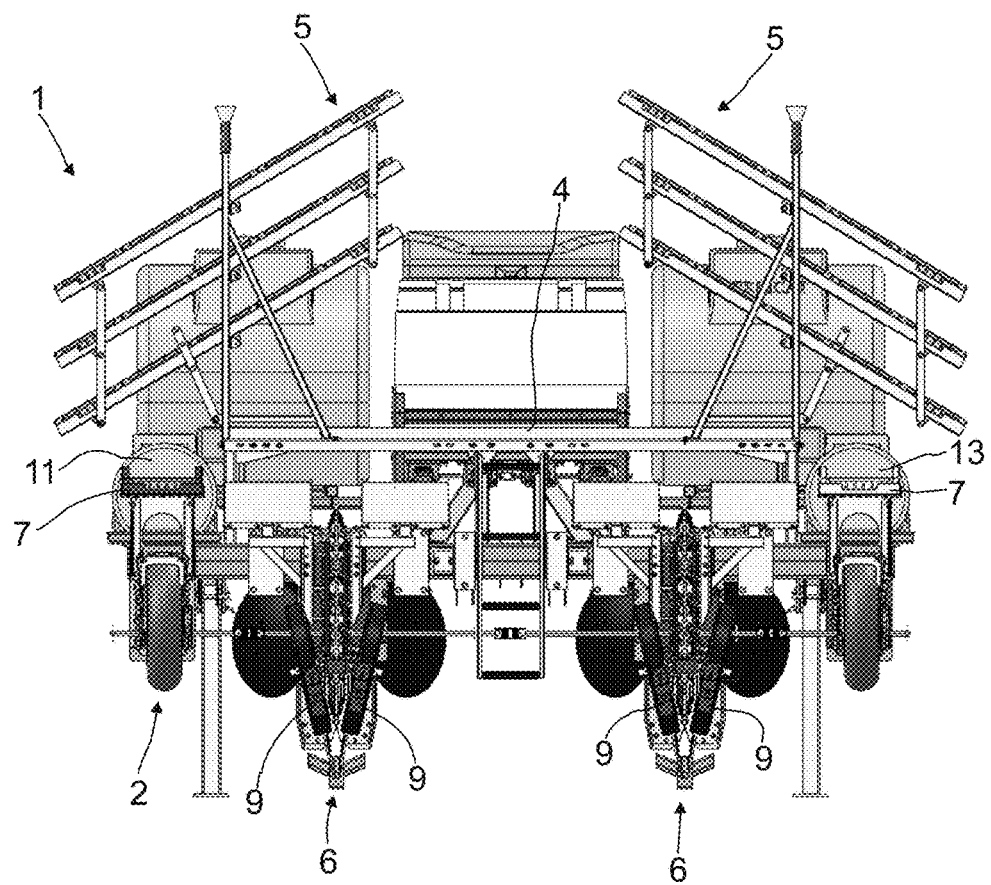
Figure 5:
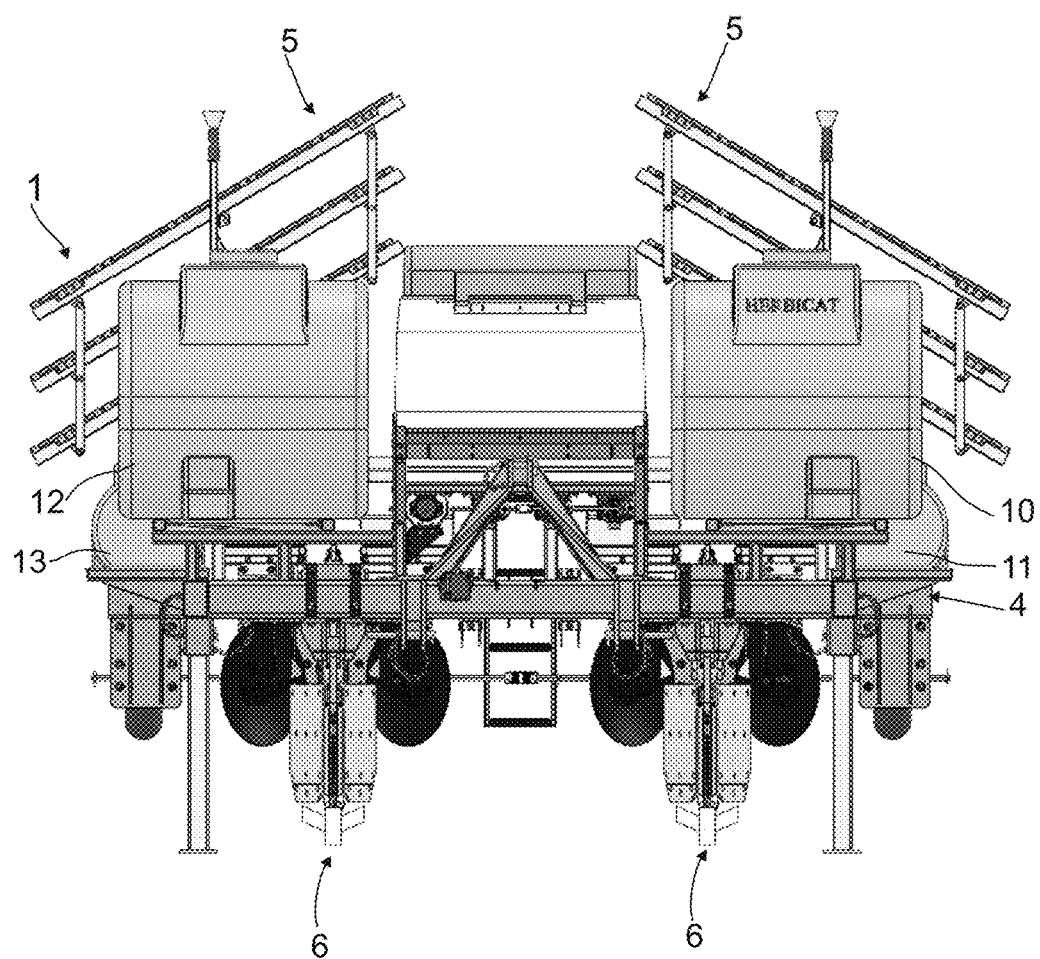
Figure 6:
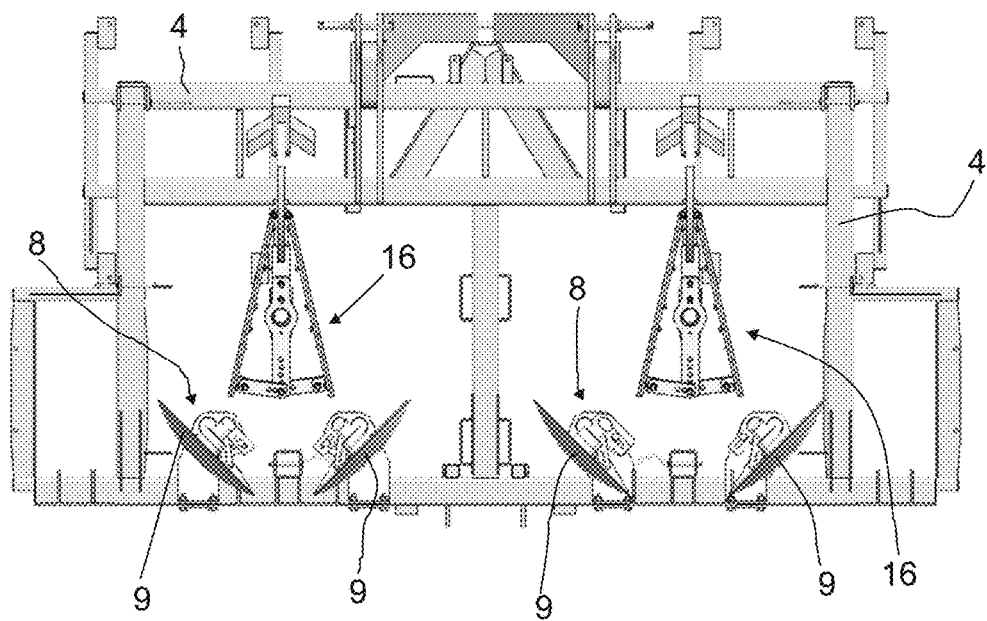
Figure 7:
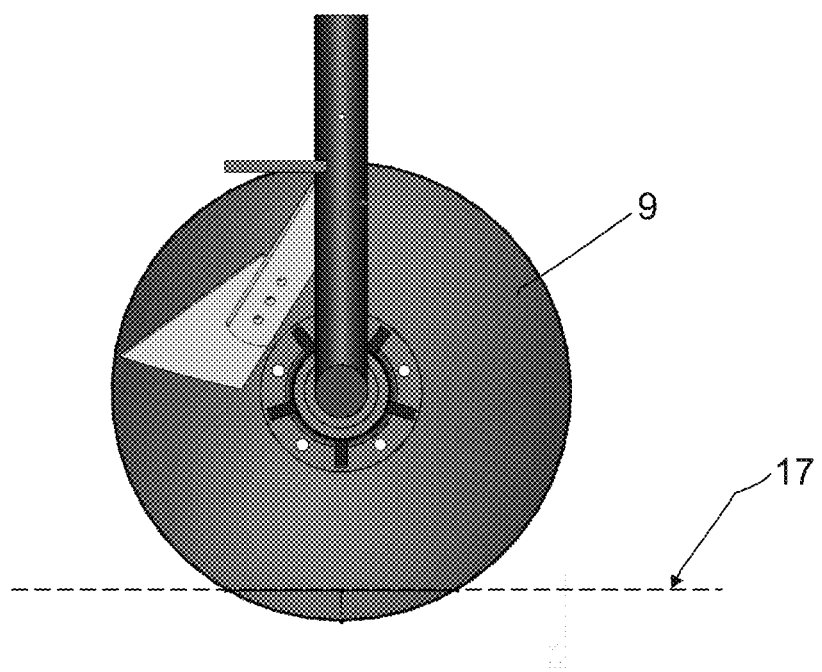
Figure 8:
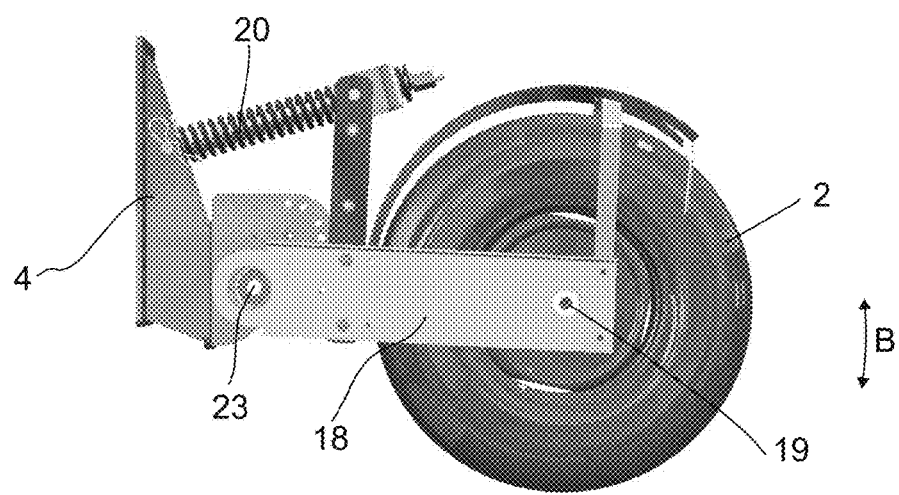
Figure 9:
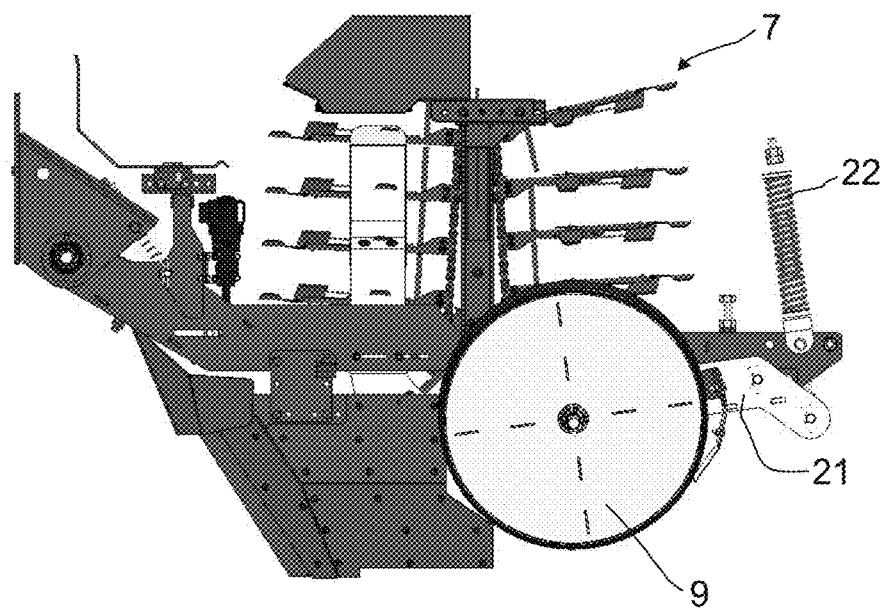
Figure 10:
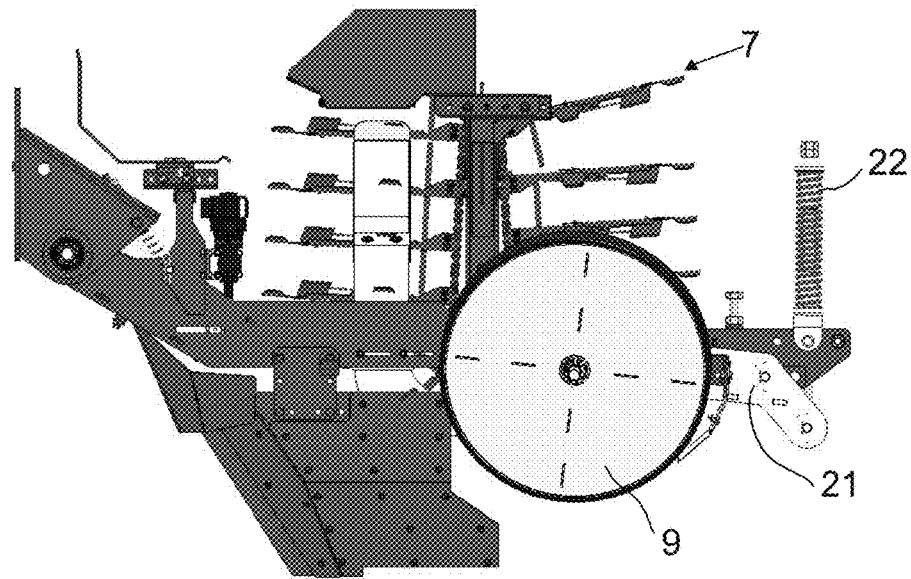
Figure 11:
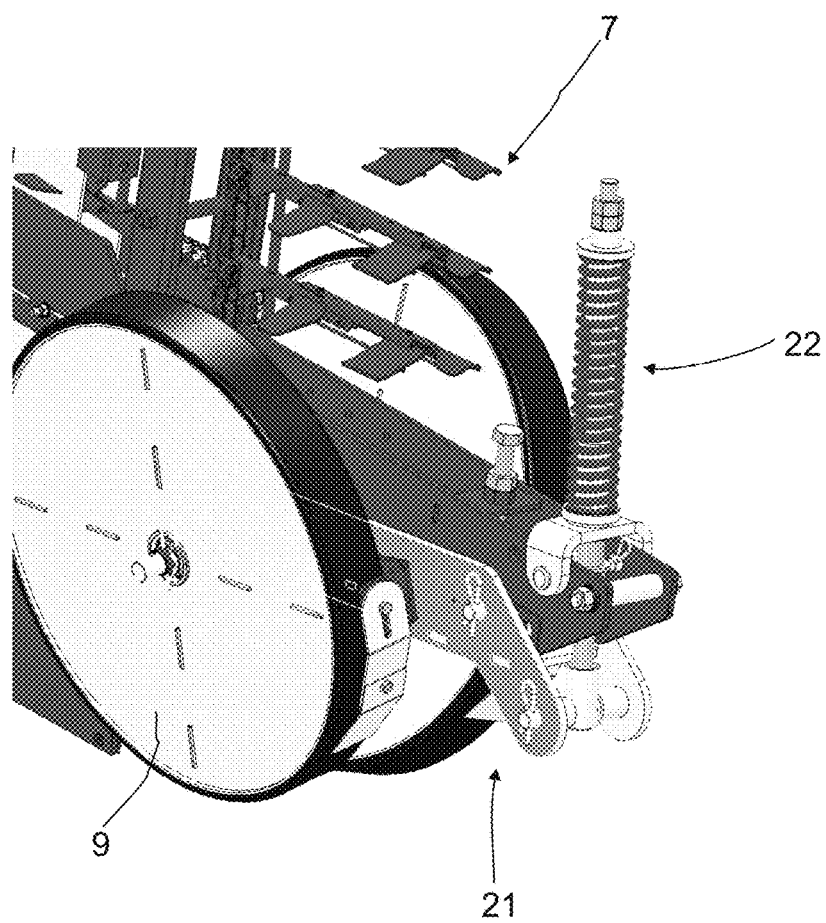
Figure 12:
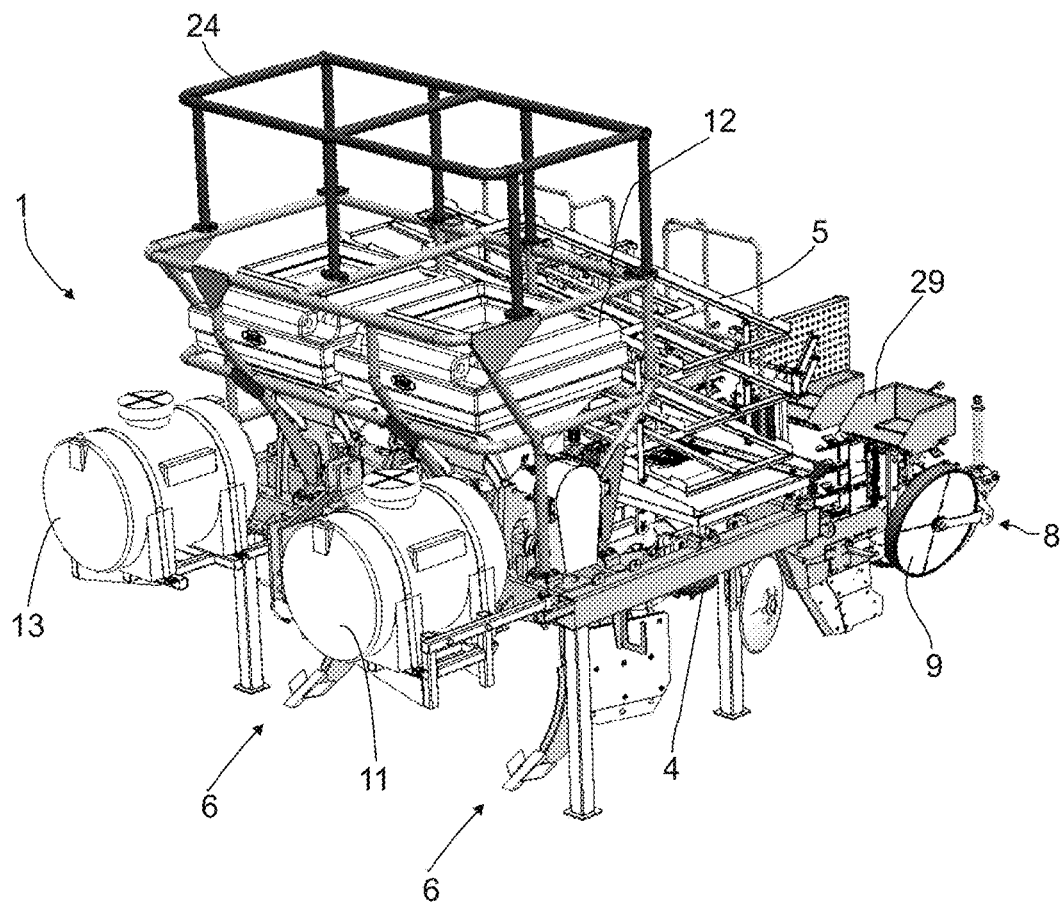
Figure 13:
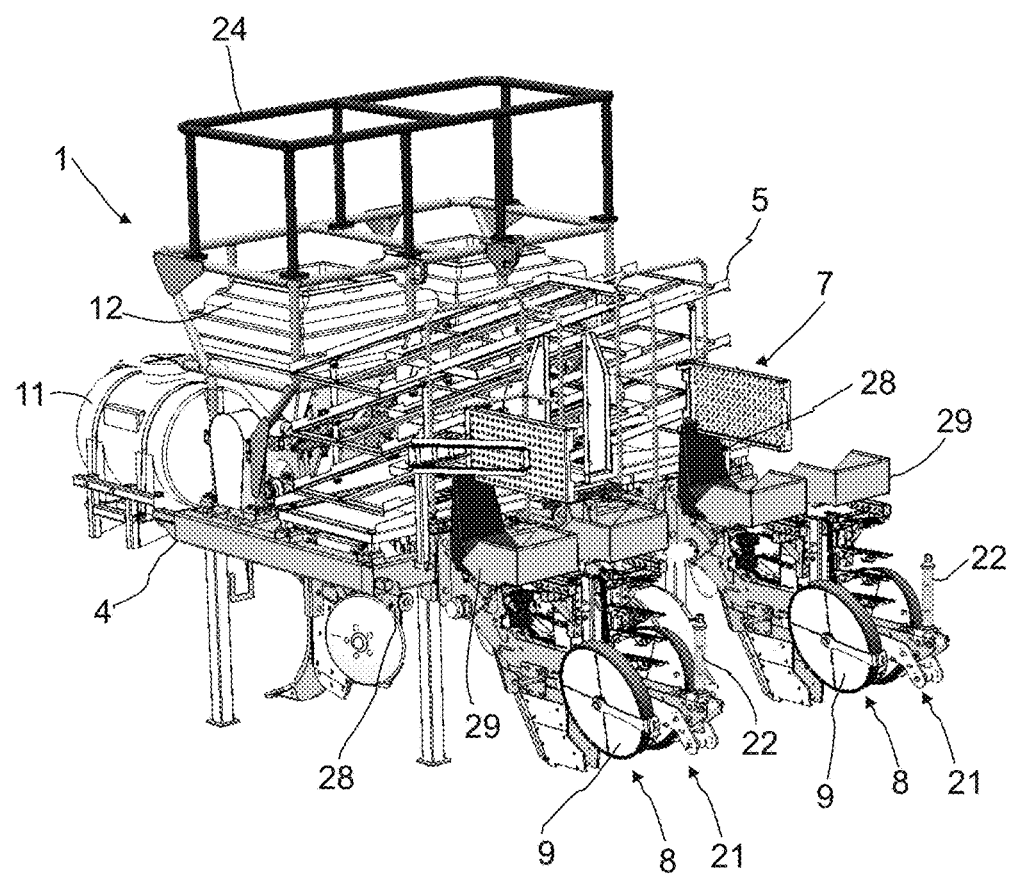
Figure 14:
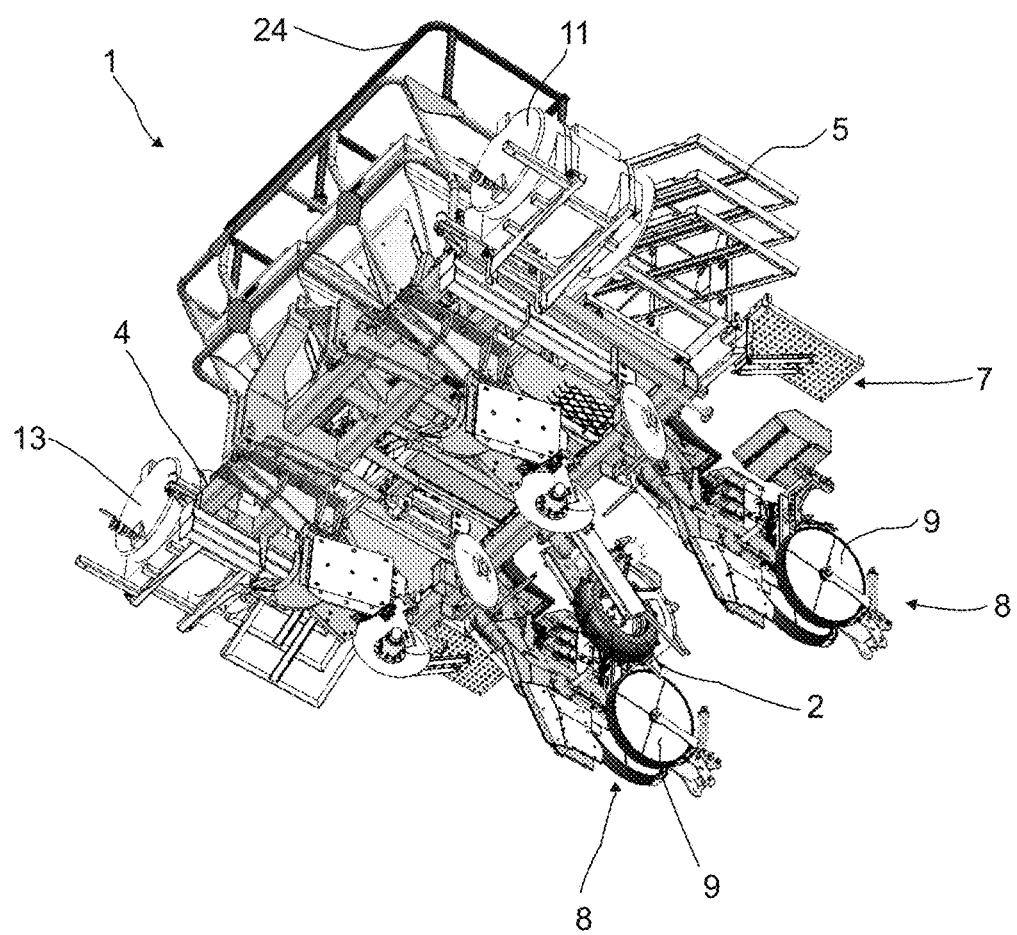
Figure 15:
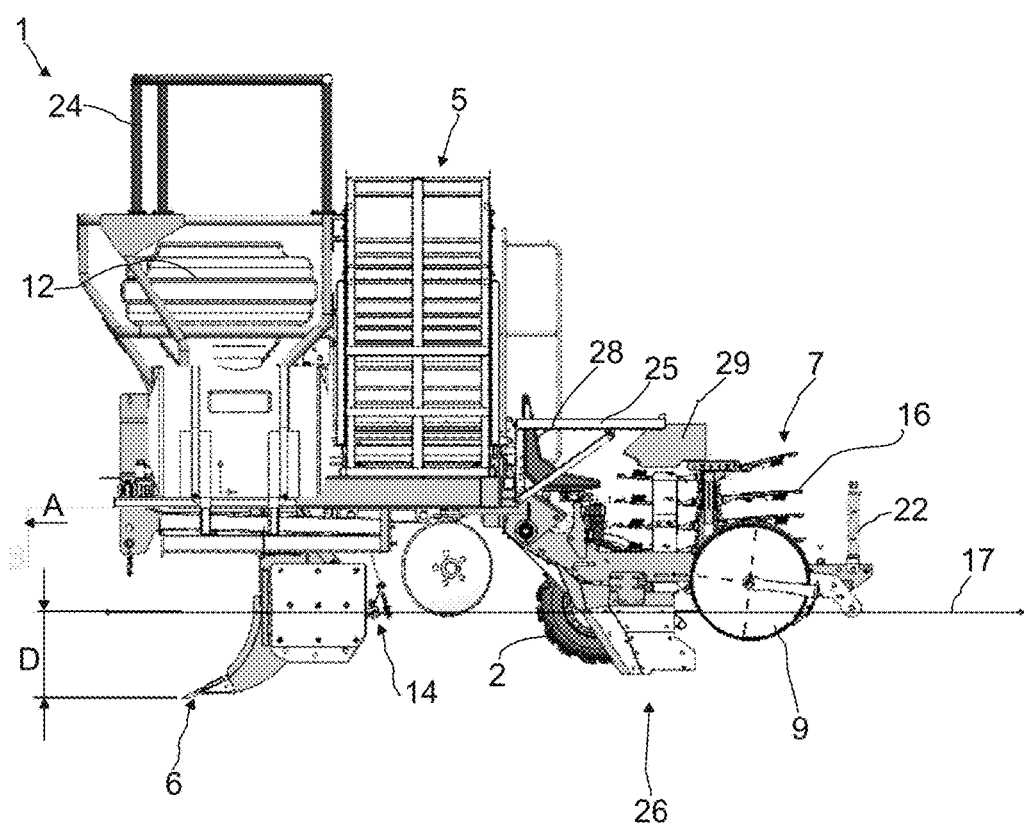
Figure 16:
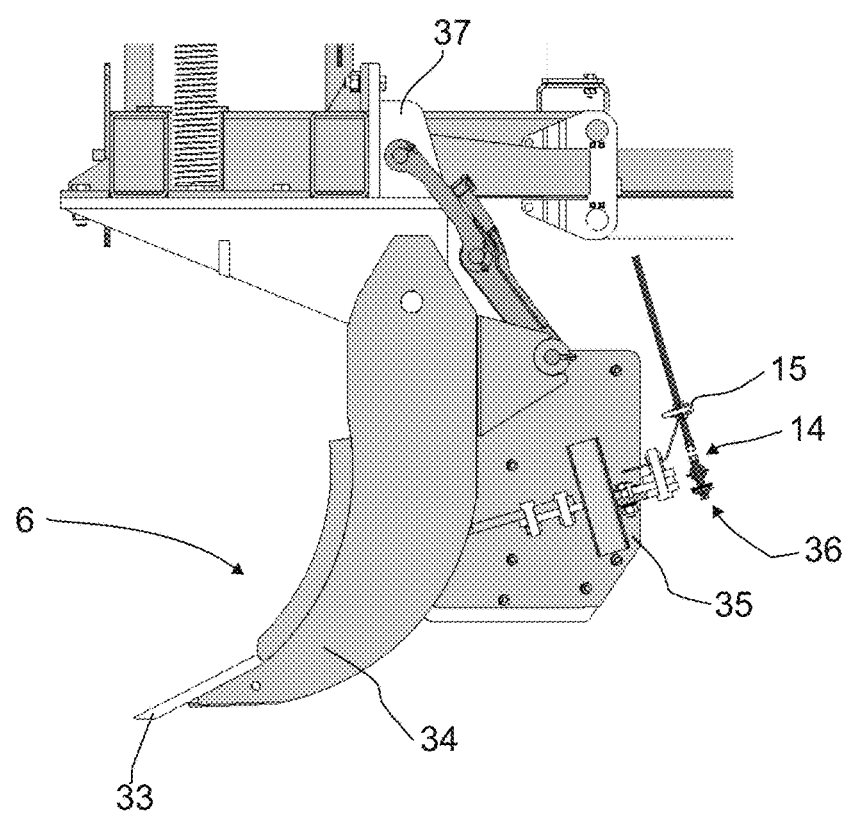
Figure 17:
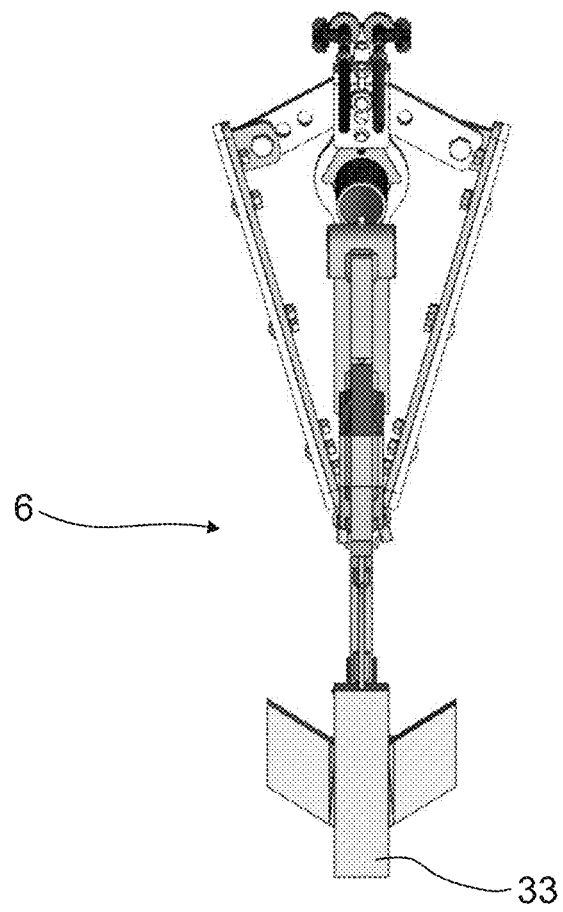
Figure 18:
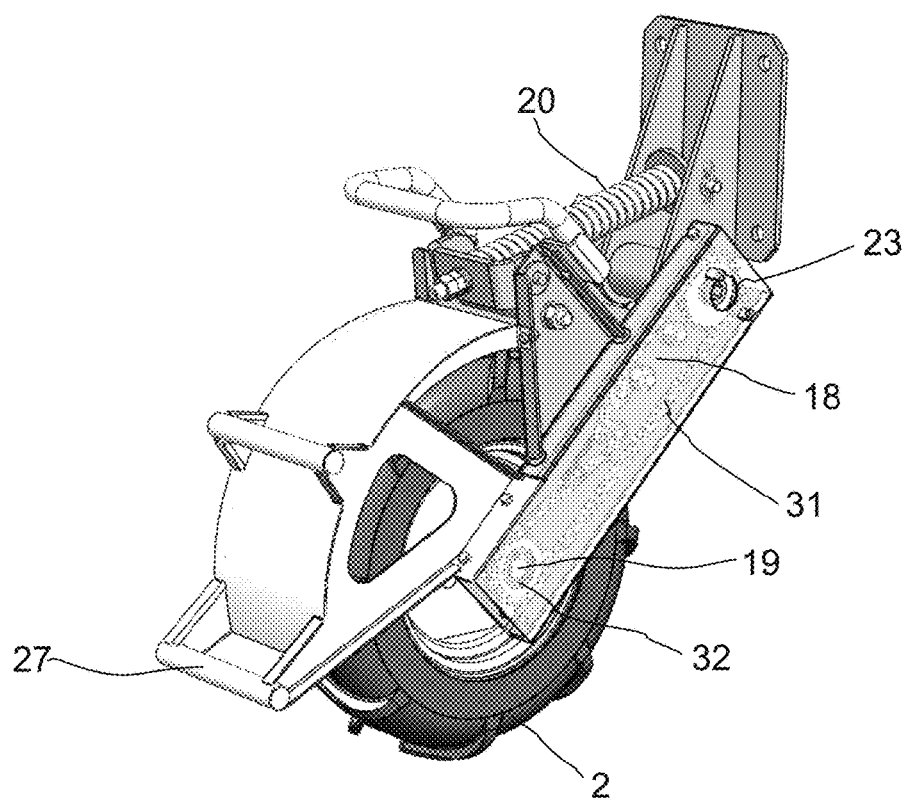
Figure 19:
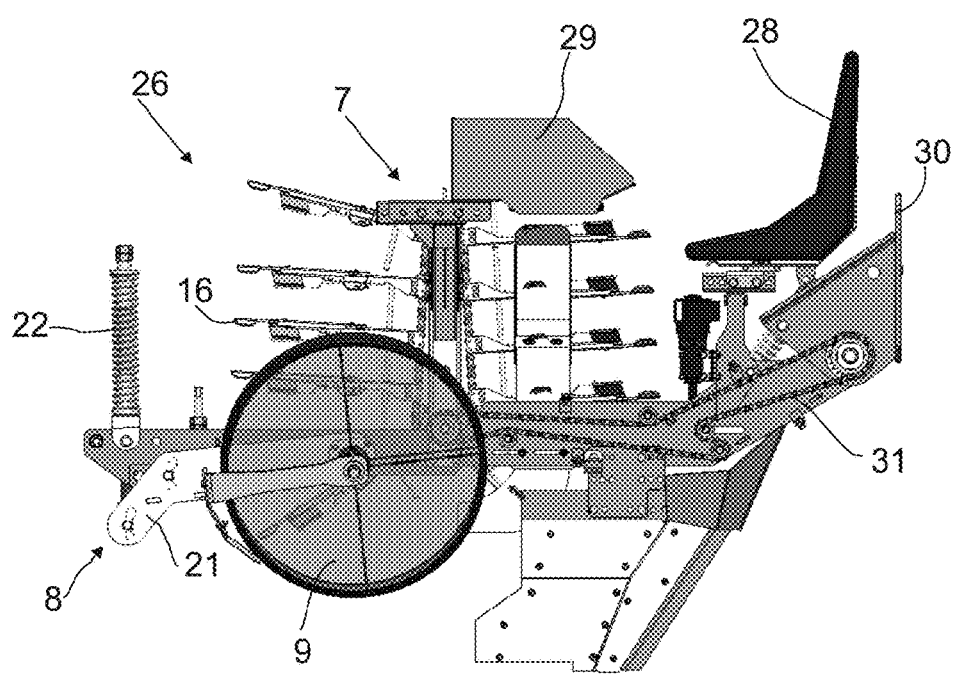

FIG. 1 shows a perspective view of a first embodiment of the apparatus according to the present invention, FIG. 2 shows another perspective view of the first embodiment of the apparatus of the present invention, FIG. 3 shows a side view of the first embodiment of the apparatus of the present invention, FIG. 4 shows a rear view of the first embodiment of the apparatus of the present invention, FIG. 5 shows a front view of the first embodiment of the apparatus of the present invention, FIG. 6 shows the furrow compactor of the first embodiment of the apparatus of the present invention, FIG. 7 shows a detail of the furrow compactor of the first embodiment of the apparatus of the present invention, FIG. 8 shows a dynamic traction wheel of the first embodiment of the apparatus of the present invention, FIGS. 9 and 10 illustrate the function of the coupling mechanism of the first embodiment of the apparatus of the present invention, FIG. 11 shows a detail of the coupling mechanism shown in FIGS. 9 and 10, FIG. 12 shows a perspective view from the front of a second embodiment of the apparatus according to the present invention, FIG. 13 shows a perspective view from behind of the second embodiment of the apparatus according to the present invention, FIG. 14 shows a bottom view of the second embodiment of the apparatus of the present invention, FIG. 15 shows a side view of the second embodiment of the apparatus of the present invention, further showing the ground level, FIG. 16 shows the furrow opener of the second embodiment of the apparatus of the present invention, FIG. 17 shows another view of the furrow opener of the second embodiment of the apparatus of the present invention, FIG. 18 shows the dynamic traction wheel of the second embodiment of the apparatus of the present invention, and FIG. 19 shows the transplanting part of the second embodiment of the apparatus of the present invention.

With reference to FIGS. 1 to 5 the general structure of the first embodiment of the apparatus 1 for planting and treating seedlings is described:

The apparatus 1 comprises dynamic traction wheels 2 for moving the apparatus 1 over a field with soil in which seedlings are to be planted. On the front side of the apparatus 1 a hitch 3 is provided. The hitch 3 is mounted to a frame 4 of the apparatus. The hitch 3 may be coupled, for example, to a tractor so that the apparatus 1 may be drawn by the tractor over the field in the direction of the arrow A as shown in FIG. 3.

The apparatus 1 comprises two furrow openers 6. The furrow openers 6 may be pushed into the soil when the apparatus 1 is moved over the field. The furrow openers 6 then lifts the soil out and moves it to both sides of the furrow openers 6 so that two furrows are formed behind the furrow openers 6. The furrow openers 6 are made from non-stick material having a ultra high molecular weight. The furrow that is formed by the furrow openers 6 has a deep of approximately 30 to 35 cm with a significant parcel of soil returning to the furrow with 7 cm to 15 cm so that the seedlings will be well compacted in soil as described later. Furthermore, there will be an extra 15 cm to 20 cm of soil above the ground level in which the seedlings are planted in order to avoid any damage of the seedlings by bouncing, pending and/or rain.

Furthermore, the frame 4 further holds several trays 5 for the seedlings. The trays 5 are adapted to hold seedlings of a sugar cane plant. The trays 5 are movable so that the seedlings that are placed on the trays 5 can be taken away from the trays 5.

The apparatus 1 further comprises a seedlings conveying device 7 that is adapted to automatically take seedlings from the trays 5 and put them to the furrows that are formed behind the furrow openers 6. The seedlings conveying device 7 comprises a platform as well as a clamp unit 16, which is described in further detail later. The seedlings conveying device 7 grabs the bale of the seedlings as gentle as possible in order to avoid any damage of the seedlings. The seedlings are then moved down to the open furrow and placed in the furrow so that the seedlings may be planted.

Alternatively, the seedlings are removed manually from the trays 5 and placed on the platform of the seedlings conveying device 7 where they are grabbed by the clamp unit 16.

The apparatus 1 further comprises a furrow compactor 8. The furrow compactor 8 comprises two wheels 9 that are arranged on both sides of the movement paths of each furrows opener 6. The two wheels 9 of the furrow compactor 8 urge the soil that has been moved out of the furrow by the furrow opener 6 back to the furrow in the surrounding of the seedlings that are placed within the furrow. The soil surrounding the planted seedlings is then compacted by the wheels 9.

The apparatus 1 is not only adapted for planting seedlings in the field but also to treat the planted seedlings in order to raise the survival rate of the seedlings. For this purpose a tank 10 for water, a tank 11 for insecticide, a tank 12 for fertilizer and a tank 13 for fungicide is mounted on the frame 4 of the apparatus 1. The tanks 10 to 13 are coupled to a pipe system that connects the tanks 10 to 13 to a spraying device 14 comprising spraying valves 15 that are controlled by a control unit (not shown).

After the seedlings have been placed in the open furrow they may be treated by an insecticide, a fertilizer and a fungicide that may be sprayed to the planted seedlings by the spraying device 14. Furthermore, water may be sprayed to the seedlings for humidity supply and for compacting the soil after the planting process.

With reference to FIGS. 6 and 7 the function of the furrow compactor 8 is described in detail:

After the seedlings have been placed in the furrow by the clamp unit 16 the furrow compactor 8 urges the soil back into the furrow and compacts the soil in the surrounding of the planted seedlings. For this purpose, two inclined wheels 9 are placed on both sides of the movement part of the furrow opener 6. As shown in FIG. 6 the axis of the wheels 9 are inclined by an angle of 45 degrees against the vertical direction. Furthermore, a section of the wheels 9 is placed below ground level 17 as shown in FIG. 7.

With reference to FIG. 8 the function of the dynamic traction wheel 2 is described in detail:

The wheel 2 is rotatably mounted on an axis 19. This axis 19 is supported by a lever 18 which on the other hand is pivotally amounted on a further axis 23. This structure is mounted on the frame 4 of the apparatus 1. Furthermore, the lever 18 is coupled to one end of a spring 20. The other end of the spring 20 is coupled to the frame 4 so that the spring 20 urges the wheel 2 mounted to the lever 18 downwards. By this mechanism the dynamic traction wheel 2 balances irregularities of the soil over which the apparatus 1 is moved by pivoting the wheel 2 against the force of the spring 20 in the direction of a arrow B as shown in FIG. 8. In particular, irregularities having a height of about 200 mm may be balanced.

With reference to FIGS. 9 to 11 the coupling mechanism 21 is described in detail:

If there are irregularities like bumps on the soil over which the apparatus 1 is moved the problem occurs that seedlings are deposited with a variable deepness while there should be standard deposition. By means of the coupling mechanism 21 the seedlings conveying device 7, in the present embodiment the clamp unit 16 of the seedlings conveying device 7 (see FIG. 6), on the one hand and the furrow compactor 8 on the other hand are coupled so that two objects are achieved: Firstly, the seedlings are placed in the furrow with a regular deepness and, secondly, with a regular compaction strength regardless of soil irregularities. The coupling mechanism 21 acts like a pantographic movement with a certain degree of freedom.

The coupling mechanism 21 comprises a spring mechanism 22 urging the wheels 9 of the furrow compactor 8 against the soil beside the furrow so that the clamp unit 16 that is coupled to the wheels 9 has a constant height over the soil when the apparatus 1 is moved over the field. Furthermore, the spring mechanism 22 urges the wheels 9 against the soils so that the wheels 9 compact the soil surrounding the seedlings with constant strength when the apparatus 1 is moved over the field. FIGS. 9 and 10 show different positions of the height of the wheels 9 and a corresponding movement of the coupling mechanism 21 and spring mechanism 22.

With reference to FIGS. 12 to 15 the general structure of the second embodiment of the apparatus 1 for planting and treating seedlings is described:

The second embodiment of the apparatus 1 of the present invention is similar to the first embodiment of this apparatus 1 as described above. Therefore, parts of the second embodiment that are identical or similar in function with respect to corresponding parts of the first embodiment are designated with the same reference signs. The description of these parts is omitted in the description of the second embodiment. However, these parts may also be used in the second embodiment. On the other hand, parts that are described in greater detail with respect to the second embodiment may also be used alone or in connection with other parts in the first embodiment.

The apparatus 1 of the second embodiment does not comprise water tanks anymore. Instead the capacity for the chemical tanks has been raised compared to the apparatus 1 of the first embodiment. In particular, a large tank 11 for an insecticide and a large tank 13 for a fungicide are provided. Furthermore, tanks 12 are provided for fertilizers. The fertilizer tanks 12 may be coupled with bags comprising the fertilizers. For these bags the apparatus 1 of the second embodiment comprises a bag protector 24.

In order to provide better access to the trays 5 for the seedlings a platform 25 is provided that is mounted at the frame 4 of the apparatus 1. FIG. 15 shows the position of the apparatus 1 with respect to the ground level 17. As it can be seen in this Figure the furrow opener 6 is arranged below ground level 17. The depth D may vary. In the present case the depth D is 410 mm. Furthermore, the dynamic traction wheels 2 as well as the wheels 9 of the furrow compactor 8 are placed partially below ground level 17.

With reference to FIGS. 16 and 17 details of the furrow opener 6 of the apparatus 1 of the second embodiment are described:

The furrow opener 6 comprises a pointer 33 which is located farest below ground level 17 as it is shown in FIG. 15. The pointer 33 is mounted on a body 34 of the furrow opener 6. The frame 4 of the apparatus 1 comprises a support 37 on which the furrow opener 6 is pivotally mounted.

Furthermore, the spraying device 14 is mounted on the body 34 of the furrow opener 6. The spraying device 14 comprises a fertilizer hose 35 that is connected to spraying valves 15. The fertilizer is feed through fertilizer hose 35 and spraying valves 15 to one or more spray nozzles 36.

With reference to FIG. 18 the dynamic traction wheel 2 of the apparatus 1 of the second embodiment is described in detail:

As already described with reference to FIG. 8 of the first embodiment the wheel 2 is mounted on an axis 19. On this axis 19 a return prevention mechanism 32 is arranged that prevents the apparatus from moving against the drawing direction A. Furthermore, axis 23 is provided with a toothed wheel so that a chain 31 may transmit the rotation of the axis 23 to the axis 32 so that the wheel 2 is driven. The driving chain 31 may be coupled to further toothed wheels for transmitting the rotation.

Furthermore, a platform access stair 27 is connected with the support for the dynamic traction wheel 2. This platform access stair 27 facilitates the access to the platform 25.

In the apparatus 1 of the second embodiment of the present invention a transplanting cart 26 is removable mounted on the frame 4 of the apparatus 1. This transplanting cart 26 is described with reference to FIG. 19:

The transplanting cart 26 comprises the furrow compactor 8 and the seedlings conveying device 7 including the clamp unit 16. Furthermore, an operator seat 28 is mounted on the transplanting cart 26. The operator seat 28 is directed rearwards so that the operator sitting on the operator seat 28 may access seedlings on seedlings platform 29. The operator may place the seedlings on the seedlings conveying device 7 which in turn conveys the seedlings to the open furrow.

LIST OF REFERENCE SIGNS 1 apparatus
2 dynamic traction wheels
3 hitch
4 frame
5 trays for seedlings
6 furrow opener
7 seedlings conveying device
8 furrow compactor
9 wheels of furrow compactor
10 tank for water
11 tank for insecticide
12 tank for fertilizer
13 tank for fungicide
14 spraying device
15 spraying valves
16 clamp unit
17 ground level
18 lever
19 axis
20 spring
21 coupling mechanism
22 spring mechanism
23 axis
24 bag protector 25 platform
26 transplanting cart
27 platform access stair
28 operator seat
29 seedlings platform
30 transplanting cart fixing plate
31 driving chain
32 return prevention mechanism
33 pointer
34 body of furrow opener
35 fertilizer hose
36 spray nozzles
37 support for furrow opener

The invention claimed is:

1. An apparatus for planting and treating seedlings of an agricultural plant, said apparatus comprising:
   means for moving said apparatus over a field with soil in which said seedlings are to be planted,
   a tray for holding a plurality of said seedlings,
   a furrow opener for automatically creating a furrow in said field when said apparatus is moved over said field,
   a seedlings conveying device for putting said seedlings from said tray in said furrow,
   a spraying device for applying a fertilizer, an insecticide, a fungicide, and/or a nutrient to said furrow,
   a furrow compactor that is adapted to close said furrow with soil and to compact said soil surrounding said seedlings in the closed furrow, and
   a coupling mechanism that couples said seedlings conveying device and said furrow compactor, wherein said coupling mechanism urges said furrow compactor against said soil besides said furrow so that said seedlings conveying device coupled to said furrow compactor has a constant height over said soil when said apparatus is moved over said field,
   wherein said coupling mechanism is a pantographic device and mechanically linked to the furrow compactor such that movement of the coupling mechanism produces identical movements of the furrow compactor.

2. The apparatus according to claim 1, wherein said coupling mechanism urges said furrow compactor against said soil so that said furrow compactor compacts said soil surrounding said seedlings with constant strength when said apparatus is moved over said field.

3. The apparatus according to claim 1, wherein said furrow compactor comprises at least two wheels, said wheels are arranged on both sides of a movement path of said furrow opener.

4. The apparatus according to claim 3, wherein said coupling mechanism urges said wheels of said furrow compactor against said soil besides said furrow so that said seedlings conveying device coupled to at least one of the wheels has a constant height over the soil when said apparatus is moved over said field.

5. The apparatus according to claim 3, wherein said coupling mechanism urges said wheels of said furrow compactor against said soil so that said wheels compact said soil surrounding said seedling with constant strength when said apparatus is moved over said field.

6. The apparatus according to claim 1, wherein said seedlings conveying device is adapted to automatically take said seedlings from said tray and to put the seedlings in said furrow.

7. The apparatus according to claim 1, wherein said seedlings conveying device comprises a clamp unit for holding said seedling and putting said seedlings in the furrow.

8. The apparatus according to claim 7, wherein said coupling mechanism couples said clamp unit of said seedlings conveying device and said furrow compactor.

9. The apparatus according to claim 7, wherein said coupling mechanism urges said furrow compactor against said soil besides the furrow so that said clamp unit coupled to said furrow compactor has a constant height over said soil when said apparatus is moved over said field.

10. The apparatus according to claim 1, wherein said coupling mechanism comprises a spring mechanism.

11. The apparatus according to claim 10, wherein said spring mechanism urges said furrow compactor against said soil besides said furrow so that said seedlings conveying device coupled to said furrow compactor has a constant height over said soil when said apparatus is moved over said field.

12. The apparatus according to claim 10, wherein said spring mechanism urges said furrow compactor against said soil so that said furrow compactor compacts said soil surrounding said seedlings with constant strength when said apparatus is moved over said field.

13. The apparatus according to claim 10, wherein said spring mechanism urges said wheels of said furrow compactor against said soil besides the furrow so that said clamp unit coupled to at least one of said wheels has a constant height over said soil when the apparatus is moved over said field.

14. The apparatus according to claim 10, wherein said spring mechanism urges said wheels against said soil so that said wheels compact said soil surrounding said seedling with constant strength when said apparatus is moved over the field.

15. The apparatus according to claim 1, wherein said furrow opener is made from non-stick material having a ultra high molecular weight.

16. The apparatus according to claim 1, wherein said apparatus further comprises a tank for insecticides and a tank for fungicides wherein both coupled said spraying device and said spraying device is further adapted to apply both insecticide and fungicide to said seedlings in said soil.

17. The apparatus according to claim 1, wherein said apparatus further comprises means for deploying superabsorbers to the surrounding of said seedlings being placed in said furrow.

18. The apparatus according to claim 1, wherein said tray and said seedlings conveying device are adapted to hold and deliver sugarcane seedlings to said soil.

* * * * *